No. 781,522. PATENTED JAN. 31, 1905.
F. D. HOWE.
WHEEL.
APPLICATION FILED JAN. 30, 1904.
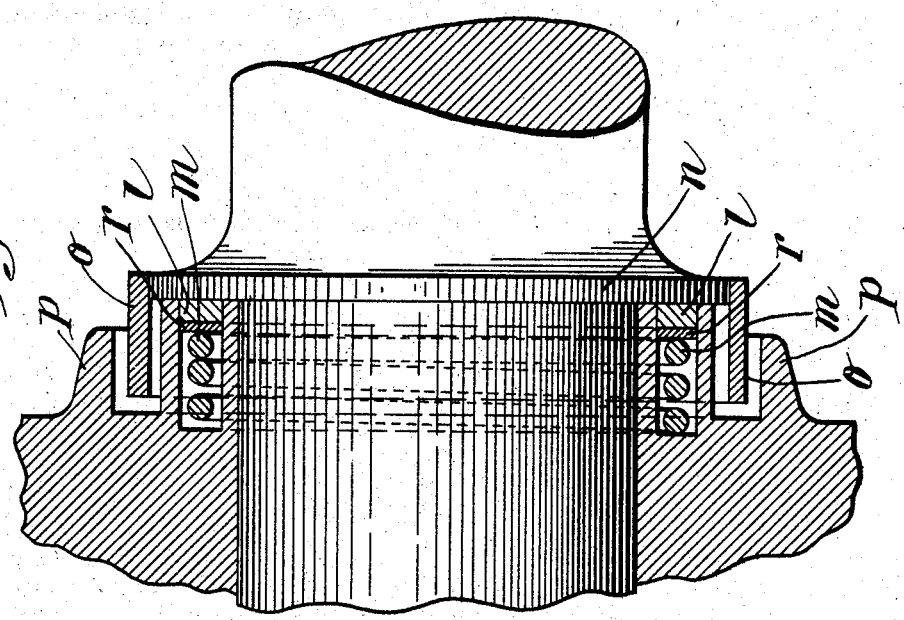
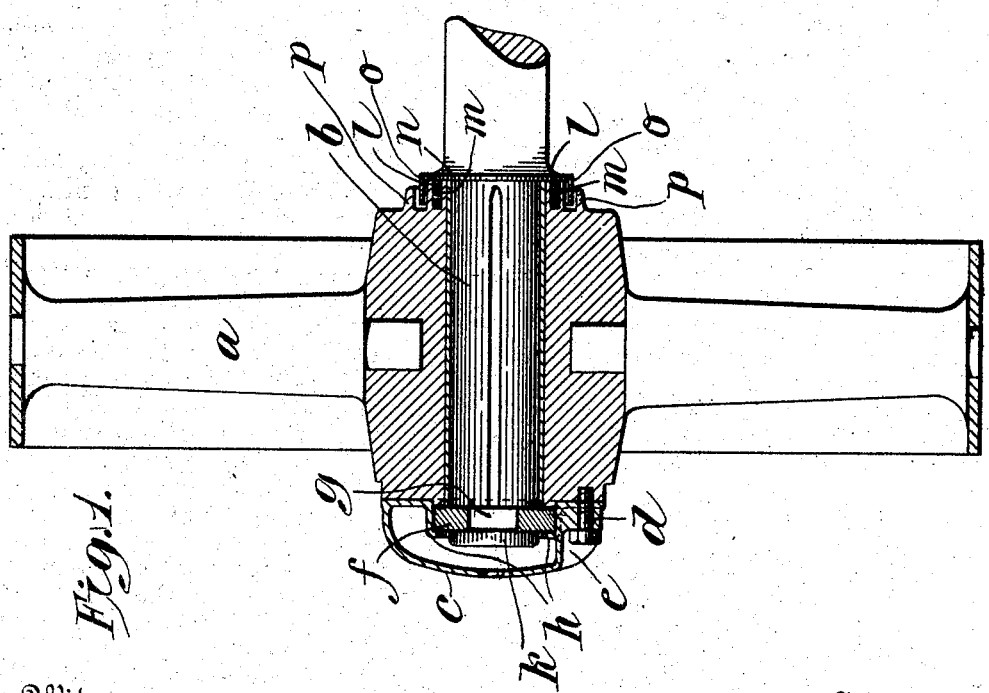
Witnesses
Lucius E. Varney
Edgeworth Greene
Inventor
Frank D. Howe
By his Attorneys
Redding, Kiddle & Greeley No. 781,522. Patented January 31, 1905.

UNITED STATES PATENT OFFICE.

FRANK D. HOWE, OF RICHMOND HILL, NEW YORK, ASSIGNOR TO GIBBS ENGINEERING & MANUFACTURING COMPANY, OF NEW YORK, N. Y., A CORPORATION OF NEW YORK.

WHEEL.

SPECIFICATION forming part of Letters Patent No. 781,522, dated January 31, 1905.

Application filed January 30, 1904. Serial No. 191,266.

*To all whom it may concern:*

Be it known that I, FRANK D. HOWE, a citizen of the United States, residing in Richmond Hill, in the county of Queens and State of New York, have invented certain new and useful Improvements in Wheels, of which the following is a specification, reference being had to the accompanying drawings, forming a part hereof.

One of the objects of the present invention is to provide improved means for fastening wheels upon the axles of vehicles. In many instances it is desirable that such fastening means be inclosed, partly for the reason that the axle and the fastening means are thus protected from collisions with other objects and from dust and dirt which ordinarily collects around the end of an exposed axle and also because the fastening means are in this way made safe from the interference of ignorant or careless persons who sometimes tighten up the fastening devices against the wheels and render the turning of the wheels difficult.

Another object of the invention is to provide means for preventing the oil upon the working surface of the axle from leaking out around the end of the wheel, and thereby smearing the adjacent parts of the wheel and of the vehicle to which the wheel is attached.

Still another object of the invention is to provide an improved means of lubricating the axle.

In the drawings, Figure 1 is a view in central section of a wheel-hub and of the axle upon which it is journaled, showing particularly the means for fastening the wheel to the axle; and Fig. 2 is a view, partly in elevation and partly in section, upon a larger scale, showing a portion of the wheel-hub and axle and illustrating the means for preventing the oil from working out around the end of the wheel.

The wheel $a$, journaled upon axle $b$, has a cap $c$, which is rigidly secured thereto by suitable fastening devices, such as bolts, one of which is shown at $d$. The exterior of the cap is preferably rounded and provided at proper intervals with recesses, as at $e$, to receive the heads of the fastening-bolts.

Surrounded by the cap $c$ and held between said cap and the wheel-hub is a thrust-collar $f$. This collar engages the axle by resting freely in a circular groove $g$, provided in the axle, and is preferably clamped tightly between a flange $h$ within the cap and the end of the wheel-hub, so that as the wheel-hub revolves about the axle the collar turns in the groove. It is immaterial, however, whether the collar revolves with the wheel or not, for, if desired, said collar may have a tight fit within the groove $g$, while its working faces are next to the cap and wheel-hub. In order to place the collar in the groove around the axle, it may be split, although it will be obvious that the end $k$ of the axle may be made in a separate piece. In the latter case the collar $f$ may be a complete ring fitted upon the end of the axle, to which the head $k$ is afterward secured. It will be clear also that the collar $f$ and head $k$ may, if desired, be made in one piece.

In order to keep the lubricating-oil from leaking out from the working surfaces of the axles and smearing the adjacent portions of the vehicle, the end of the wheel-hub next to the vehicle is provided with a circular groove extending around the axle, Fig. 2, in which there is provided a packing-ring $l$, which is caused by the force of a spring $m$ to press outwardly against the flange $n$ upon and around the axle. Between the spring and packing-ring there is preferably a washer $r$, of leather or some suitable material, to form an oil-tight joint. In this way the oil is effectively confined to the working surfaces for which it is intended. In order to prevent any oil which happens to work past the packing-ring $l$ from escaping and also to protect the working surface of the axle from dust and dirt, a flat ring $o$ is secured to the flange $n$, and the wheel is provided with a broad flange $p$, overlapping the ring $o$, as clearly shown in Fig. 2.

To provide lubricant for the working surfaces of the wheel and axle, the cap c is made hollow and is filled with oil. This oil works back and forth around the collar f and over the working surfaces of the axle and wheel and is prevented from escaping at the other end of the wheel-hub by the packing-ring l, just described.

I claim as my invention—

1. The combination of an axle having on its outer end an annular groove, a wheel-hub on the axle, a split collar arranged in the groove of the axle against the outer end of the hub, and a cap removably secured against the outer face of the hub, having an internal flange bearing against the outer face of the split collar.

2. The combination of an axle having on its outer end an annular groove, a wheel-hub on the axle, a split collar arranged in the groove of the axle against the outer end of the hub, and a cap having recesses formed in its outer face, bolts having their heads in said recesses and extending into the outer end of the wheel-hub to hold the cap against its outer face, the cap having an internal flange bearing against the outer face of the split collar.

3. The combination of an axle, a wheel-hub thereon having in its inner end two annular concentric grooves, a flange on the axle bearing against the inner end of the hub and closing the inner groove of the hub and having secured thereto a ring extending into the outer groove of the hub, a metallic packing-ring in the inner groove, a spring in the inner groove holding the packing-ring against the flange of the axle, and a non-metallic washer between the packing-ring and the spring.

This specification signed and witnessed this 28th day of January, A. D. 1904.

FRANK D. HOWE.

In presence of—
 F. W. Dawson,
 Geo. S. Downing.